No. 804,124. PATENTED NOV. 7, 1905.
W. HEFFLIN.
BRAKE MECHANISM.
APPLICATION FILED JAN. 19, 1905.
2 SHEETS—SHEET 1.
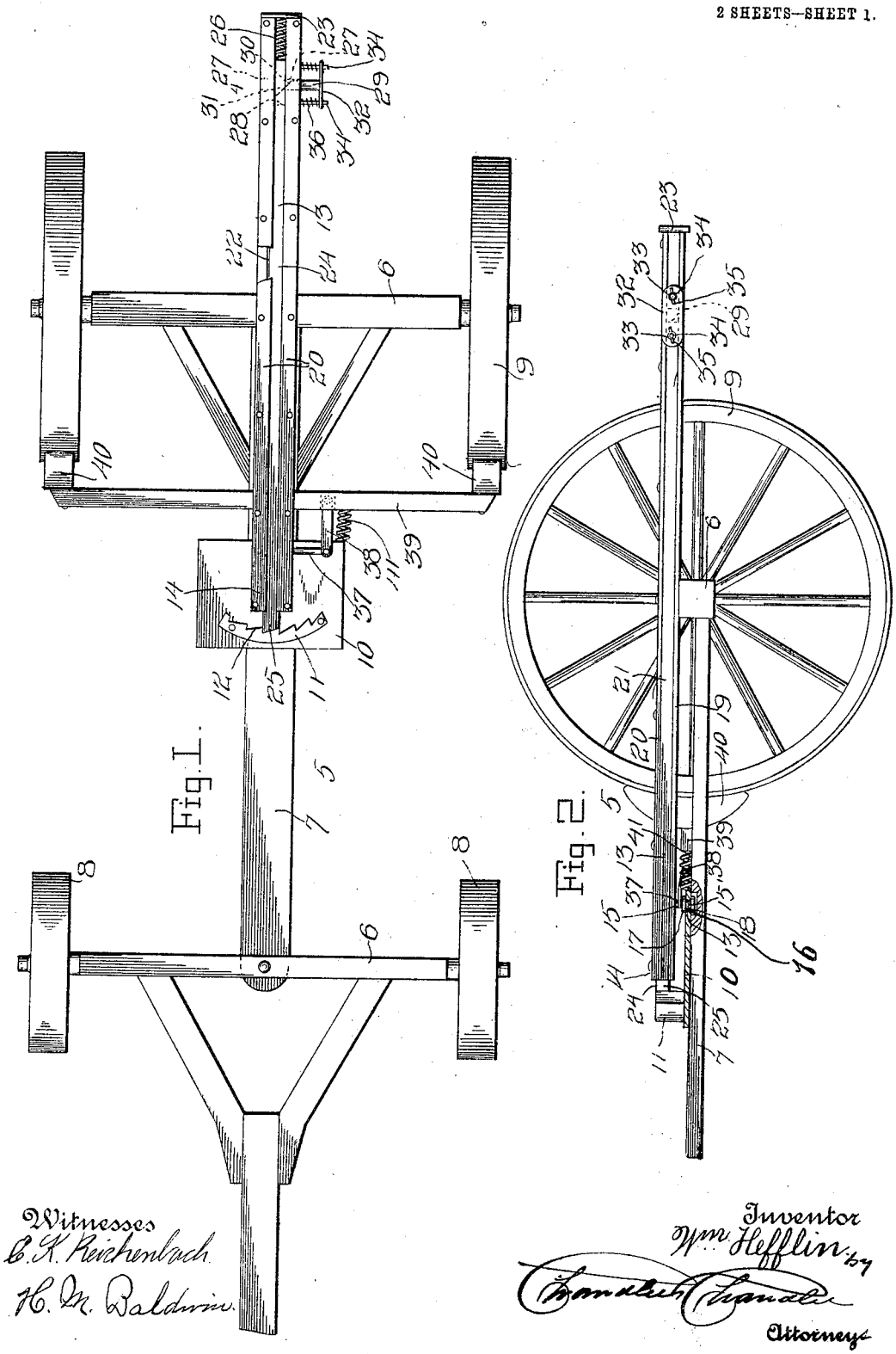
Witnesses
C. K. Reichenbach
H. M. Baldwin
Inventor
Wm. Hefflin
by
Chandlee Chandlee
Attorneys No. 804,124. PATENTED NOV. 7, 1905.
W. HEFFLIN.
BRAKE MECHANISM.
APPLICATION FILED JAN. 19, 1905.
2 SHEETS—SHEET 2.
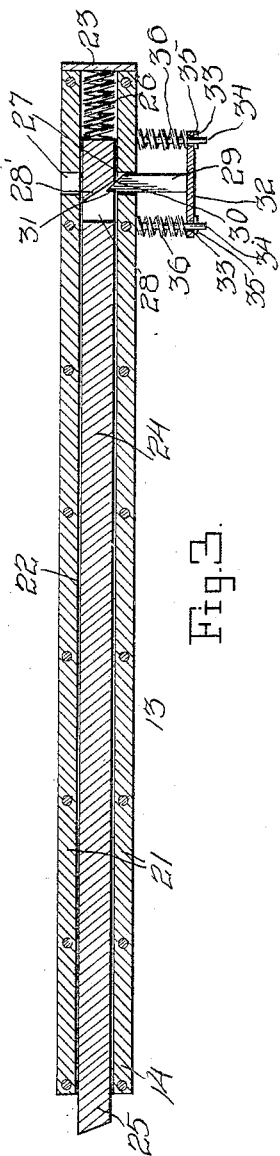
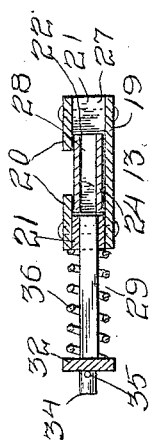
Witnesses
C. K. Reichenbach.
H. M. Baldwin.
Inventor
Wm Hefflin
by
Chandlee & Chandlee
Attorneys

UNITED STATES PATENT OFFICE.

WILLIAM HEFFLIN, OF MICHIGAN BAR, CALIFORNIA.

BRAKE MECHANISM.

No. 804,124.      Specification of Letters Patent.      Patented Nov. 7, 1905.

Application filed January 19, 1905. Serial No. 241,838.

*To all whom it may concern:*

Be it known that I, WILLIAM HEFFLIN, a citizen of the United States, residing at Michigan Bar, in the county of Sacramento, State of California, have invented certain new and useful Improvements in Brake Mechanisms; and I do hereby declare the following to be a full, clear, and exact description of the invention, such as will enable others skilled in the art to which it appertains to make and use the same.

This invention relates to brake mechanisms, and more particularly to brake mechanisms for road-wagons, and has for its object to provide a mechanism which, while being efficient, will be simple in arrangement and which may be incorporated in a wagon at a low figure.

Another object is to provide a brake mechanism provided with means for locking the brakes in operative position and which will be so constructed that the locking mechanism may be easily moved into and out of operative position simultaneously with the brake mechanism.

Other objects and advantages will be apparent from the following description, and it will be understood that modifications of the specific construction shown may be made and any suitable materials may be used without departing from the spirit of the invention.

In the drawings forming a portion of this specification, and in which like numerals of reference indicate similar parts in the several views, Figure 1 is a top plan view of a running-gear of a wagon provided with the present invention. Fig. 2 is a side elevation of Fig. 1, the horizontal plate being shown in section. Fig. 3 is a horizontal longitudinal section of the lever. Fig. 4 is a transverse section of the lever on line 4 4 of Fig. 1.

Referring now to the drawings, there is shown the running-gear 5 of a wagon, including the axles 6, connecting reach-pole 7, and front and rear wheels 8 and 9, respectively. Secured to the reach-pole 7 forwardly of the rear axle there is a horizontal plate 10, having an arc-shaped ratchet-bar 11 thereupon, the ratchet-teeth 12 of which are formed upon the concave face thereof, and this concave face is directed toward the rear axle.

Pivoted upon the upper face of the plate 10 and spaced vertically therefrom there is a brake-lever 13. This lever, extending rearwardly beyond the rear axle and being so disposed at its forward end 14, just clears the ratchet-bar 11, the ratchet-bar being disposed concentrically with the pivot-point of the brake-lever, as shown. The brake-lever is pivoted to the plate 10 through the medium of a downwardly-extending stem 15, carried by the lever and having its lower portion 15' passed through an opening 16 in the plate 10, in which it is revoluble. The stem 15 has a collar 17 formed thereupon in spaced relation to the lever 13, and this collar rests upon the upper surface of the plate 10 to hold the lever in spaced relation thereto, as mentioned above. Engaged with the stem 15 below the plate 10 there is a nut 18, which prevents disengagement of the stem from the opening 16. As shown, the ratchet-bar 11 extends upwardly from the plate and lies with its upper edge flush with the upper face of the lever.

The lever 13 consists of a bottom plate 19, which carries the stem 15, and an upper plate 20, which are held in spaced relation to each other by members 21, which lie with their outer faces flush with the side edges of the plates 19 and 20 and are disposed with their inner faces in spaced relation to each other, so that the lever has a longitudinal passage 22 extending therethrough. At the forward end 14 of the lever this passage is open; but at its rearward end it is closed by a plate 23, which is secured to the rearward ends of the members 21 and extends upwardly and downwardly over the rearward edges of the plates 20 and 19, respectively.

Disposed within the passage 22 there is a dog 24, which is held normally with its forward end 25 projected beyond the forward end 14 of the lever and in engagement with the teeth 12 of the ratchet-bar 11, this dog being thus held by a spring 26, disposed between the rearward end of the dog and the plate 23. Formed transversely through the members 21, adjacent to the rearward ends thereof, are registering passages 27, and formed transversely through the dog 24 there is a passage 28, the rearward wall 28' of which is inclined from one side of the dog to the other, and when the dog is in its normal position the rearmost end of this inclined wall 28' lies just rearwardly of the forward wall of one of the passages 27. A pin 29 lies normally with its inner end engaged in this passage 27, and the rearward corner of the rearward end of the pin is beveled as, shown at 30, the forward corner 31 of the pin being disposed for movement into the portion of the passage 28 which extends rearwardly over the passage 27, as mentioned above, to bring the bevel portion 30 of the pin 29 into engagement with the inclined wall 28', such engagement resulting in rearward movement of the dog 24 against the action of the spring 26 to bring the forward end 25 of the dog out of engagement with the teeth 12. The pin 29 extends outwardly of the passage 27, in which its inner end normally lies, and secured to the outer end of this pin there is a transverse plate 32, having openings 33 adjacent to its ends, in which are slidably engaged rods 34, which extend outwardly from the outer face of the adjacent member 21, these rods having transverse pins 35 engaged in their outer ends to prevent disengagement of the plate therefrom, and engaged with the rods 34, between the plate 32 and the adjacent face of the lever 13, are helical springs 36, which hold the pin 39 yieldably in its normal position.

Extending laterally from the stem 15 above the collar 17 and at right angles to the pole 7 there is an arm 37, having pivoted thereto the forward end of a rod 38, carried by a transversely-extending brake-rod 39, which is slidably connected with the pole 7 and which has brake-shoes 40 at its ends disposed for engagement of the wheels 9 when the rod 39 is moved rearwardly. It will be apparent from the drawings that this arrangement is such that when the lever 13 is moved in one direction the brake-shoes 40 will be moved into operative position and that they will be moved into inoperative position when the lever is moved in the opposite direction, and the arrangement of the above-described parts is such that engagement of the dog 24 with the teeth 12 will hold the shoes in their operative positions. To hold the shoes normally in inoperative position, a spring 41 is secured at one end to the plate 10 and at the other end to the rod 39.

When it is desired to apply the brakes, the rearward end of the lever is grasped at the hand, the plates 32 being also grasped to move the pin 29 inwardly and retract the dog, as described above, to permit of movement of the lever. The lever is then moved to apply the brakes and the plate 32 is released, which permits the dog to come into engagement with the teeth of the ratchet-bar 11 to hold the shoes 40 in engagement with the wheels 9, as described above. The manner of releasing the brakes will be readily understood without further description.

What is claimed is—

1. In a mechanism of the class described, the combination with movable brake-shoes, of a lever connected with the shoes for operation thereof, said lever having a passage therewithin, a dog slidably disposed in the passage and movable to project therefrom at one end, yieldable means for holding the dog normally in such position, a latch disposed for engagement by the outwardly-projecting end of the dog when in its normal position, said dog having a passage therethrough provided with a bevel-wall and a pin slidably engaged in the lever and adapted for engagement with the bevel-wall of the passage to move the lever out of its normal position, said dog being arranged for engagement with the latch to hold the shoes in operative position.

2. In a lever mechanism for brakes the combination with a plate, of a lever pivoted to the plate, an arcuate ratchet-bar mounted upon the plate concentric with the pivot-point of the lever, a dog slidably mounted in the lever and lying normally projected therefrom at one end and in engagement with the ratchet-bar to prevent movement of the lever, said dog having a tapered passage therethrough, means for holding the dog yieldably in its normal position, a pin slidably engaged in the lever and having a beveled face, said pin being disposed for movement to bring its beveled face into engagement with a slanting wall of the tapered passage to move the dog against the action of the holding means, and a handplate carried by the pin and adapted to be grasped simultaneously with the lever for movement of the dog out of engagement with the ratchet-bar when the lever is to be operated.

In testimony whereof I affix my signature in presence of two witnesses.

WILLIAM HEFFLIN.

Witnesses:
 HARRY E. HEFFLIN,
 W. A. BENNETTS.